United States Patent [19]

Church

[11] Patent Number: 5,562,773
[45] Date of Patent: Oct. 8, 1996

[54] TIRE CONDITIONING APPARATUS

[76] Inventor: Clyde M. Church, 1325 E. Wesleyan Dr., Tempe, Ariz. 85282

[21] Appl. No.: 323,784

[22] Filed: Oct. 17, 1994

[51] Int. Cl.[6] .................................................. B05B 13/02
[52] U.S. Cl. ........................ 118/321; 118/323; 118/320; 118/318
[58] Field of Search ..................................... 118/323, 317, 118/321, DIG. 10, 320, 318; 454/50, 51–55, 63, 64, 66; 254/50.1, 50.4; 198/379; 55/DIG. 46

[56] References Cited

U.S. PATENT DOCUMENTS

| | | | |
|---|---|---|---|
| 4,115,172 | 9/1978 | Baboff et al. | 156/115 |
| 4,638,756 | 1/1987 | Collmann | 118/215 |
| 4,669,417 | 6/1987 | Pederson et al. | 118/44 |
| 4,955,990 | 9/1990 | Napadow | 55/90 |
| 4,958,587 | 9/1990 | Fogal, Sr. et al. | 118/206 |
| 5,165,273 | 11/1992 | Church | 73/146 |

Primary Examiner—Donald E. Czaja
Assistant Examiner—Calvin Padgett
Attorney, Agent, or Firm—Cahill, Sutton & Thomas P.L.C.

[57] ABSTRACT

A support structure supports and rotates a tire in an upright position. An open ended spray chamber is movable to receive a portion of a tire. Spray nozzles in the spray chamber spray conditioning liquid onto the tire as the latter is rotated on the support structure. The spray chamber is movable away from the tire to give free access to the tire. A blower associated with the spray chamber draws air into the open end of the chamber to prevent sprayed liquid from exiting the chamber.

5 Claims, 2 Drawing Sheets

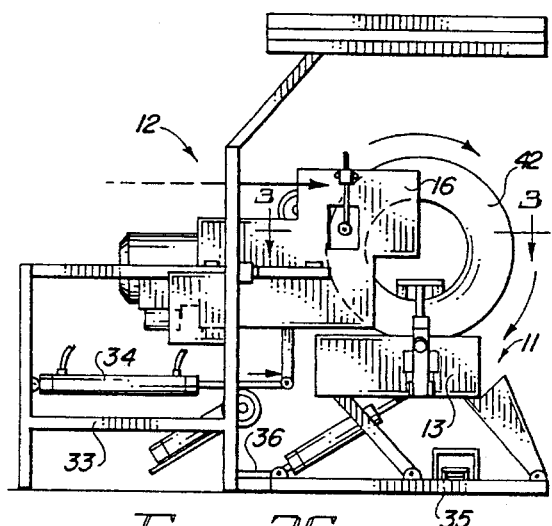
FIG.2C
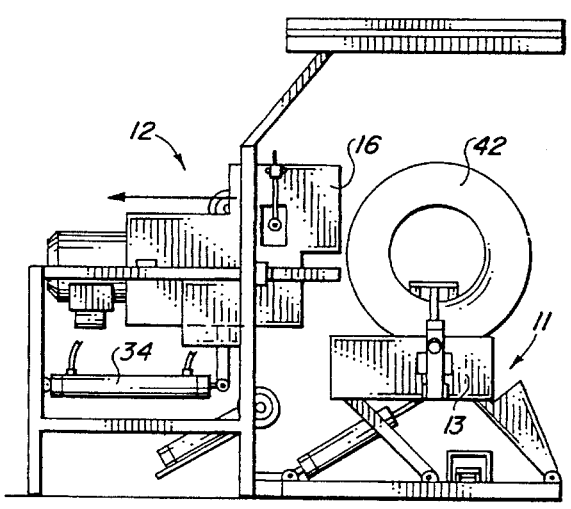
FIG.2D
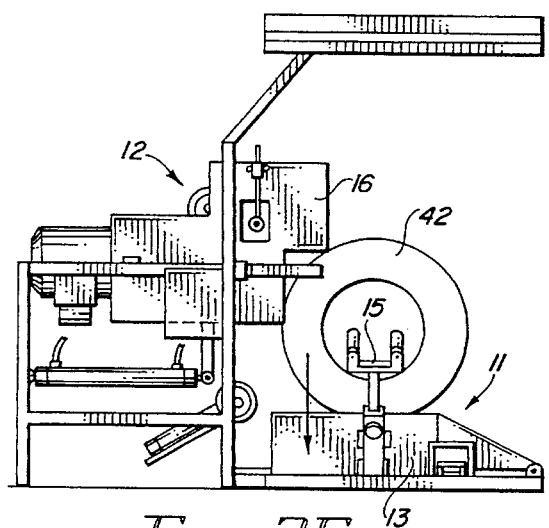
FIG.2E
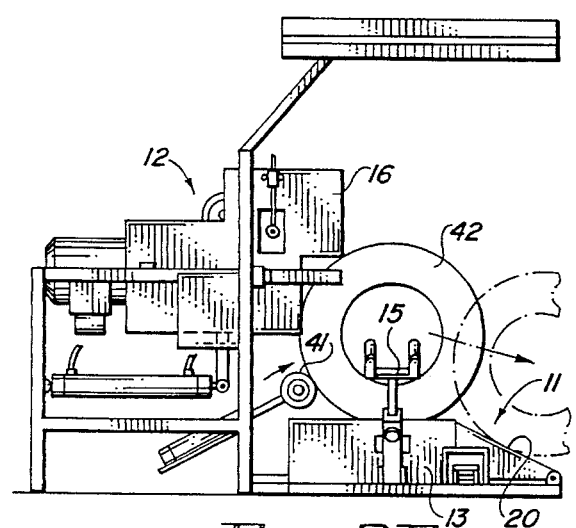
FIG.2F
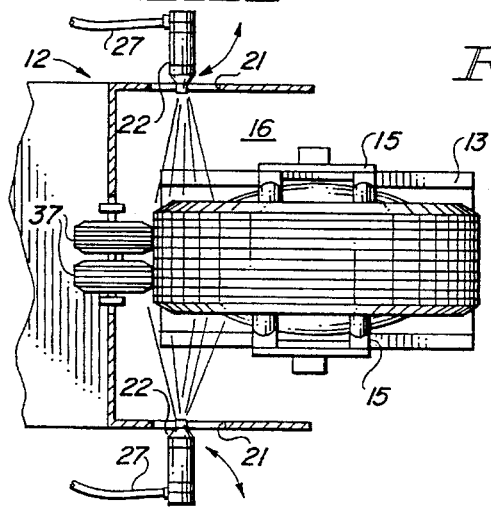
FIG.3
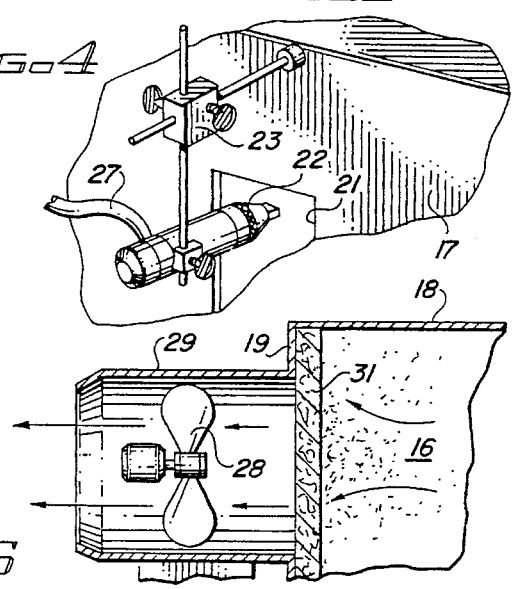
FIG.4
FIG.5

TIRE CONDITIONING APPARATUS

TECHNICAL FIELD

This invention is concerned with facilitating the conditioning of vehicle tires as by spraying the exterior surfaces with a liquid preservative and decorative coating.

BACKGROUND ART

U.S. Pat. No. 5,165,273 granted to the present applicant, Clyde M. Church, on Nov. 24, 1992, for "Tire Inspection Apparatus" discloses a support structure for holding a tire in an upright position and for rotating the tire for inspection purposes. The support structure has a ramp associated therewith to facilitate loading the tire and means for elevating the support structure and tire to a more convenient inspection position.

The Background Art section of the aforementioned Church patent describes several other prior art machines for supporting and rotating tires for inspection. That discussion is incorporated herein by reference.

Following inspection of the tire, it is often desirable to condition the tire by spraying a liquid preservative and decorative coating on the outside of the carcass. None of the prior art mentioned above addresses this procedure.

DISCLOSURE OF THE INVENTION

This invention contemplates utilization of the tire supporting and rotating capabilities of an inspection machine in the conditioning operation, thereby eliminating the necessity of providing these capabilities in a separate conditioning machine.

The improved apparatus includes an open ended spray chamber structure which is mounted for movement between first and second positions. In its first position, the spray chamber structure is clear of a tire on the supporting and rotating structure of the inspection machine. This position of the spray chamber structure provides for a clear view of the tire for inspection. In the second position of the spray chamber structure, a portion of the tire enters the chamber through its open end so that chamber structure envelopes that portion of the tire. At least one spray nozzle associated with the spray chamber structure is positioned to spray conditioning liquid onto the tire as it is rotated by the inspection system.

BRIEF DESCRIPTION OF THE DRAWINGS

The invention is described in greater detail hereinafter by reference to the accompanying drawings, wherein:

FIGS. 2A–2F are elevational views illustrating operation of the apparatus;

FIG. 3 is an enlarged, horizontal sectional view through spray chamber structure of the invention, taken generally as indicated by line 3—3 in FIG. 2B;

FIG. 4 is an enlarged, fragmentary view of the spray chamber structure illustrating a spray nozzle employed therein; and FIG. 5 is a fragmentary, vertical sectional view through an air blower associated with the spray chamber.

BEST MODE FOR CARRYING OUT THE INVENTION

Figure 1:
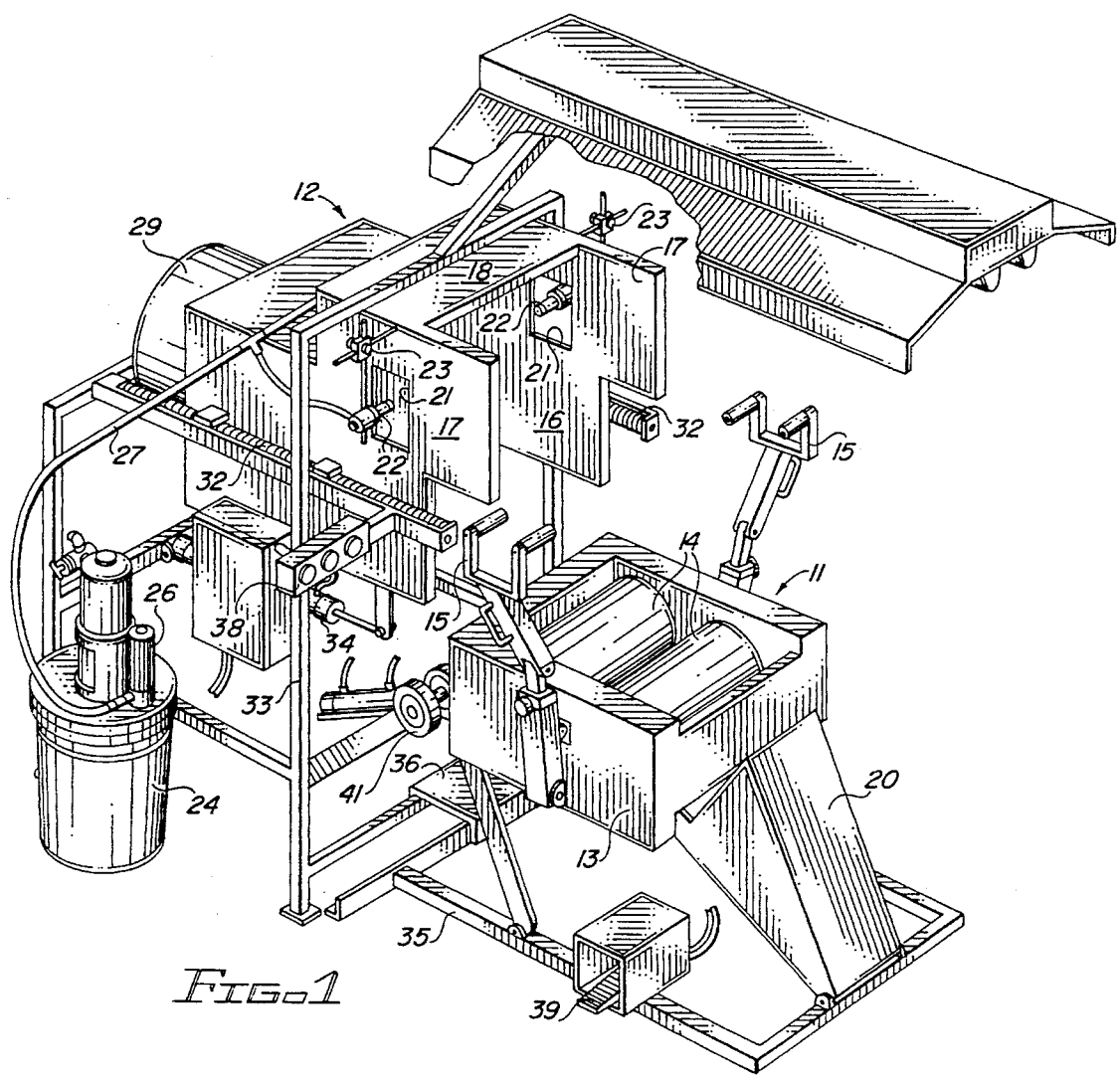
FIG. 1 is a perspective view of tire inspection and conditioning apparatus embodying this invention.

Referring particularly to FIG. 1, the tire conditioning apparatus of this invention is comprised of two principal systems, namely, a tire inspection system 11 and a tire spraying system 12.

The tire inspection system 11 shown is essentially the same as that described and claimed in the aforementioned Church '273 patent. It includes a tire support structure 13 having a pair of rollers 14 in an upper region thereof. Rollers 14 provide supporting surfaces for a tire resting on the rollers in an upright position. Drive means (not shown) housed in support structure 13 rotate rollers 14 under control of an operator to effect rotation of the tire during inspection.

Figures 2A, 2B:
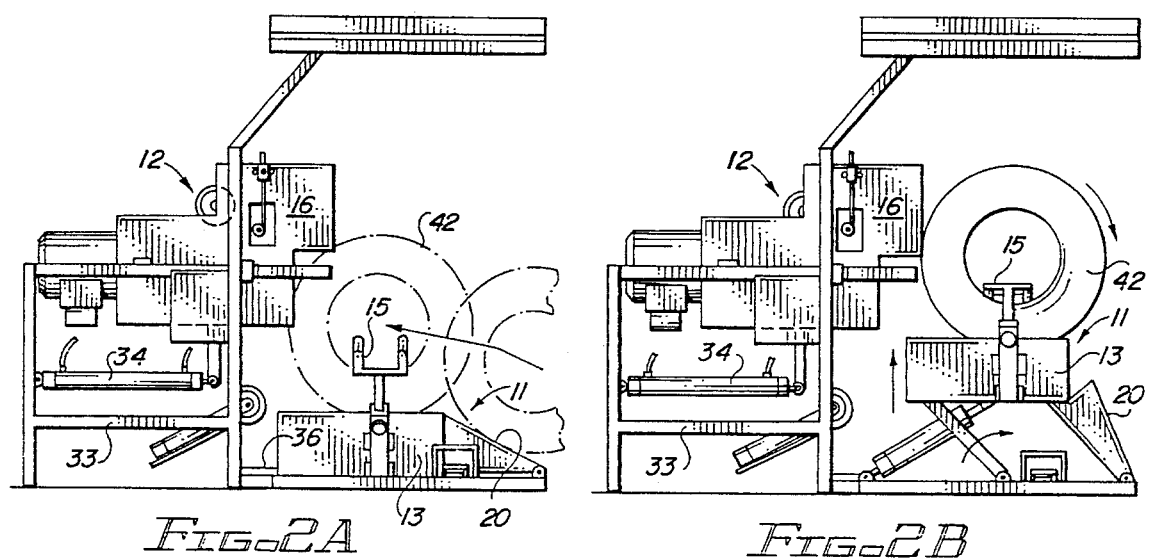

Support structure 13 is movable between a lowered, loading position (shown in FIG. 2A) to an elevated, inspection position (shown in FIGS. 1 and 2E). In the latter position, a pair of spreader arms 15 are swung into the tire casing and moved apart by a drive mechanism (not shown) in support structure 13. When the spreader arms 15 are pulled apart, they spread apart opposite regions of the tire beads to expose the interior of the tire for inspection and to hold the tire upright on the support structure as the tire is rotated by rollers 14.

A ramp 20 is provided as a part of the tire inspection system 11 to facilitate rolling the tire onto an off of support structure 13.

The tire spraying system includes a box-like, open-ended spray chamber 16 having side walls 17, a partial top wall 18, and a rear wall 19. Each side wall 17 of the spray chamber has an opening 21 therein through which a pair of spray nozzles 22 direct sprays of conditioning fluid into the interior of the chamber. Each nozzle 22 is supported by an adjustable mounting arrangement 23 carried by side wall 17 of chamber 16 to permit the direction of the spray emanating from each nozzle to be adjusted.

Conditioning liquid, which preferably an aqueous mixture of carbon black, styrene butadine latex and a surfactant is stored in a reservoir 24 from which it is pumped by a pump 26 through a flexible hose system 27 to the nozzles 22.

To prevent overspray from leaving spray chamber 16 through its opening front end, air is drawn through that open end into and through the chamber by a motor-driven blower 28 contained in a housing 29 carried at the rear wall 19 of the chamber. (See FIG. 5) The rear wall 19 of housing 16 is preferably lined with a filter medium 31, such as spun fiberglass, to trap overspray before it reaches the blower 28.

Spray chamber 16 and associated components, such as spray nozzles 22 and blower 28, are mounted for sliding movement along a pair of horizontal rails 32 carried in a floor-mounted frame 33. Spray chamber 16 is moved by a pneumatic cylinder 34 between first and second positions. In its first position (shown in FIGS. 1 and 2A), the spray chamber is retracted from the tire inspection system 11 and the tire positioned thereon. In its second position (shown in FIG. 2C), the spray chamber is positioned over the tire inspection system so that the tire thereon has an arcuate portion thereof positioned within the spray chamber.

Frame 33 of the tire spraying system 12 and frame 35 of the tire inspection system 11 are preferably linked by a spacer 36 for maintaining proper spacing between the two systems. However, because both structures may be called upon to work with different size, i.e., different diameter, tires, it is desirable to provide a stop mechanism for positioning the spray chamber 16 relative to the tire itself in the spray chamber's second position. For this purpose, the spray chamber 16 has mounted therein a pair of stop rollers 37 which are adapted to engage the tread of the tire on the inspection system 11 and thereby position the spray chamber 16 and spray nozzles 22 to properly direct conditioning spray onto the tire.

Actuation of the tire rotating rollers 14, the spray chamber pneumatic chamber 34, and the spray liquid pump 26 is under the control of the operator via a control panel 38. Raising and lower of the tire support structure 13 is also operator controlled, preferably via a foot pedal 39.

If desired, the tire spraying system 12 may also comprise a pneumatically actuated push roller 41 for urging a conditioned tire off the support structure 13 after the tire has been sprayed.

The sequence of inspecting and conditioning a tire 42 is illustrated in FIGS. 2A through 2F. The steps involved are as follows. The tire 42 is rolled up ramp 20 onto support structure 13 which is in its lowered, loading position (FIG. 2A). The support structure is then elevated to its inspection position, the spreader arms 15 engage and spread portions of the tire beads and the inner casing is inspected as the tire is rotated (FIG. 2B). Following completion of a satisfactory inspection, spray chamber 16 is moved toward the inspection system 11 so that a portion of the tire 42 enters the spray chamber; the tire is rotated and sprayed with conditioner from nozzles 22 (FIG. 2C). When the entire outer surface of the tire 42 has been sprayed, spraying is discontinued and the spray chamber 16 is retracted from the inspection system 11 (FIG. 2D). The spreader arms 15 are disengaged from the tire and the support structure 13 is lowered (FIG. 2E). Finally, the push roller 41 is actuated to urge the conditioned tire off the support structure (FIG. 2F).

From the foregoing, it should be apparent that this invention provides a convenient and reliable system for inspecting and conditioning tires.

What is claimed is:

1. Tire conditioning apparatus comprising a support structure including means for supporting and rotating a tire in an upright position, spray chamber means having an open end, said spray chamber means being mounted for movement between a first position in which it is clear of a tire on the support structure and a second position in which a portion of the tire enters the spray chamber through the open end, at least one spray nozzle carried by said spray chamber means for spraying conditioning liquid on the tire as the tire is rotated, and means carried by said spray chamber means for drawing air into the spray chamber means through its open end to prevent overspray from leaving the spray chamber means.

2. The apparatus of claim 1, further comprising filter means disposed between said at least one spray nozzle and said air drawing means for preventing overspray from being drawn from the spray chamber means.

3. The apparatus of claim 1, further comprising a roller stop on said spray chamber means, said roller stop being engagable with the periphery of a tire on said support structure to stop the spray chamber means in its said second position.

4. The apparatus of claim 1, further characterized in that said spray chamber means is mounted for horizontal movement between its first and second positions.

5. The apparatus of claim 1, further characterized in that said support structure is movable from a lowered, loading position to an elevated, working position, and said spray chamber means is movable to its said second position when the support structure is in its elevated position.

\* \* \* \* \*